United States Patent [19]

Shigenai et al.

[11] Patent Number: 5,005,092
[45] Date of Patent: Apr. 2, 1991

[54] SHUTTER OPENING DEVICE

[75] Inventors: Osamu Shigenai, Furukawa; Keiichi Sato, Shiogama, both of Japan

[73] Assignee: Alps Electric Co., Ltd., Tokyo, Japan

[21] Appl. No.: 456,921

[22] Filed: Dec. 26, 1989

[30] Foreign Application Priority Data

Apr. 7, 1989 [JP] Japan .................................. 1-40478[U]

[51] Int. Cl.$^5$ .................................................. G11B 17/02
[52] U.S. Cl. ........................................ 360/99.06; 360/99.02
[58] Field of Search ............... 360/99.01, 99.02, 99.03, 360/99.06, 99.07

[56] References Cited

U.S. PATENT DOCUMENTS 4,685,010  8/1987  Tronzano ........................... 360/97
4,833,553  5/1989  Noda et al. ........................ 360/99.06

Primary Examiner—Robert S. Tupper
Attorney, Agent, or Firm—Guy W. Shoup

[57] ABSTRACT

In a shutter opening device including a lever member to be operated according to an inserting force of a disc cartridge which lever member operates to open a shutter of the disc cartridge in a direction perpendicular to an inserting direction of the disc cartridge, the lever member is provided at its contact end portion with an inclined surface adapted to contact a corner of the shutter.

2 Claims, 8 Drawing Sheets

SHUTTER OPENING DEVICE

BACKGROUND OF THE INVENTION

The present invention relates to a shutter opening device for opening a shutter mounted on a disc cartridge, which includes a hard case and a disc-shaped information recording medium contained in the hard case, upon recording and reproducing information on the medium with a disc driving device.

A magnetic disc for use with a personal computer is generally classified into a 5.25 inch-diameter floppy disc and a 3.5 inch-diameter floppy disc. The 5.25 inch-diameter floppy disc is contained in a flexible case, which is formed with a head insertion opening for allowing insertion of a magnetic head therefrom and effecting writing or reading of signals. In contrast, the 3.5 inch-diameter floppy disc is contained in a disc cartridge case having a shutter for normally closing a head insertion opening, and when signals are written or read, the shutter must be opened to expose the head insertion opening and allow insertion of the magnetic head therefrom. Therefore, the disc driving device is provided with a shutter opening device.

FIG. 7 is a bottom plan view of a 3.5 inch-diameter floppy disc cartridge generally designated by reference numeral 1. Referring to FIG. 7, the disc cartridge 1 is basically comprised of a hard case 2 having a square shape as viewed in plan, a magnetic disc 3 rotatably contained in the case 2, and a shutter 4 mounted on a forward end portion of the case 2 with respect to an insert direction of the case 2 into the disc driving device as depicted by an arrow A, which shutter 4 is slidable in a direction (as depicted by an arrow B) perpendicular to the insert direction of the case 2.

FIGS. 8 and 9 are a perspective view of the shutter 4 and a cross section taken along the line C—C in FIG. 8, respectively. Referring to FIGS. 8 and 9, the shutter 4 has a substantially U-shaped configuration, and a bottom side portion of the shutter 4 to be opposed to a magnetic head mounted on the side of a carriage (not shown) upon loading of the disc cartridge 1 is formed with a pair of hinges 5a and 5b projecting inwardly. Referring back to FIG. 7, the case 2 is formed with a guide channel 6 on the bottom side to be engaged with the hinges 5a and 5b of the shutter 4 in such a manner that the hinges 5a and 5b can slide along the guide channel 6 in the direction B. Reference numeral 7 designates a pair of magnetic head insertion openings formed on the opposite sides of the case 2.

FIG. 10 is a plan view of a cartridge holder 8 for receiving the disc cartridge 1 and retaining the same therein. Referring to FIG. 10, there is provided an ejecting plate or lever member 9 at a right upper portion of the cartridge holder 8 as viewed in FIG. 10, that is, at a deepest portion of the cartridge holder 8 with respect to the insert direction A of the disc cartridge 1. The ejecting plate 9 functions to open the shutter 4 upon insertion of the disc cartridge 1 and push the disc cartridge 1 upon ejecting of the same. A tension coil spring 10 is engaged between a hook 17 of the ejecting plate 9 and a hook 18 of the cartridge holder 8 so that the ejecting plate 9 is elastically biased in a counterclockwise direction as viewed in FIG. 10 by the spring 10 and is rotatably supported by a pin 11. FIG. 10 shows an unloaded condition where the disc cartridge 1 is not inserted in the cartridge holder 8. When the disc cartridge 1 is inserted from a cartridge insert hole 12 of the disc cartridge 1, a contact portion E of the disc cartridge 1 as shown in FIG. 7 is brought into contact with a contact edge 13 of the ejecting plate 9. When the disc cartridge 1 is further inserted, the ejecting plate 9 is rotated clockwise as shown by an arrow F in FIG. 10 against the biasing force of the tension coil spring 10. Accordingly, the contact edge 13 of the ejecting plate 9 is moved leftwardly as viewed in FIG. 10 to thereby urge an end surface 16 of the shutter 4 and open the shutter 4.

Generally, a disc driving device having the above-mentioned cartridge holder 8 for use with the disc cartridge 1 is designed in such a manner that the disc cartridge 1 is horizontally loaded into the cartridge holder 8 irrespective of a horizontal condition or a vertical condition of the disc cartridge 1. Therefore, a force for opening the shutter 4 after contacting of the disc cartridge 1 with the ejecting plate 9 is caused by either of a pushing force from an operator or a drawing force to be generated by an auto-loading mechanism provided in the disc driving device. However, there has been developed another type disc driving device as designated by reference numeral 14 in FIG. 11 such that the disc cartridge 1 is inserted vertically downwardly. In this type disc driving device 14, the disc cartridge 1 is obliged to fall freely at the initial stage of insertion, causing impact of the contact portion E of the disc cartridge 1 against the contact edge 13 of the ejecting plate 9. As a result, the shutter 4 of the disc cartridge 1 is brought into disengagement from the case 2 as shown in FIGS. 12 and 13. FIG. 12 is a top plan view of the disc cartridge 1, and FIG. 13 is a bottom plan view of the disc cartridge 1. Referring to FIG. 14 which shows an essential part of the disc cartridge 1 in perspective, a supporting portion 15 of the case for supporting the hinge 5a of the shutter 4 is formed in a cantilever fashion. Although such a cantilever structure contributes to simple and convenient mounting of the shutter 4, it is considered that when an unintended excess force is applied to the shutter 4 in a disengaging direction thereof, the supporting portion 15 will be flexed to cause disengagement of the hinge 5a.

FIG. 15 is an enlarged plan view illustrating the relationship between the ejecting plate 9 and the shutter 4 when the contact edge 13 of the ejecting plate 9 comes into abutment against the end surface 16 of the shutter 4 to open the shutter 4. There will now be studied a force F to be applied to the hinge 5a by impact insertion of the disc cartridge 1 into the cartridge holder of the disc driving device with reference to FIG. 15. Referring to FIG. 15, reference character b denotes a distance between both the hinges 5a and 5b; reference character a denotes an arm length between an abutment point 13a of the contact edge 13 and the hinges 5a and 5b; reference character l denotes a distance between the center of the right hinge 5b and the end surface 16 of the shutter 4; reference character $f_1$ denotes a force to be applied to the shutter 4 by a clockwise moment of the ejecting plate 9 upon impact insertion of the disc cartridge 1; and reference character $f_2$ denotes an anti-frictional force to be generated by a reaction of an elastic force normally applied to the shutter 4 in its closing direction.

In this case, a force $F_1$ to be applied to the hinge 5a due to the force $f_1$ is expressed as follows:

$$F_1 = (f_1 \times a)/b$$

Further, a force $F_2$ to be applied to the hinge $5a$ due to the force $f_2$ is expressed as follows:

$$F_2 = (f_2 \times l)/b$$

Accordingly, the resultant force F to be applied to the hinge $5a$ is expressed as follows:

$$F = F_1 + F_2$$

This force F is applied in a direction as shown by an arrow β coinciding with the shutter insert direction. If the resultant force F exceeds an elastic limit of the supporting portion 15 of the case, the supporting portion 15 is elastically deformed to cause the disengagement of the hinge $5a$ from the guide channel 6 as shown in FIGS. 12 and 13, resulting in an unusable condition of the disc cartridge 1. The elastic limit as mentioned above is about 200 gf at a low value. In some case, when the disc cartridge is let freely fall from a height of about 7 cm to abut against the contact edge 13 of the ejecting plate 9, the hinge $5a$ of the shutter 4 comes into disengagement. In this case, the contact edge 13 of the shutter 4 first abuts against the contact portion E of the case 2, and then impulsively abuts against the end surface 16 of the shutter 4.

To prevent the disengagement of the hinge $5a$, it is considered to form the ejecting plate 9 into a shape such that the contact edge 13 first abuts against the shutter 4. However, there is generated a force resisting insertion of the shutter 4 in a direction counter to that of the force $f_2$ shown in FIG. 15, causing the generation of a frictional force due to this resisting force to result in a possibility of the shutter 4 being unopened.

SUMMARY OF THE INVENTION

It is an object of the present invention to provide a shutter opening device which may prevent the disengagement of the shutter of the disc cartridge upon insertion of the disc cartridge into the disc driving device and may reliably open the shutter.

According to the present invention, the contact edge of the lever member for opening the shutter is formed with an inclined surface to be brought into contact with a corner of the shutter. A front end of the lever member is first brought into contact with the case of the disc cartridge, and the inclined surface of the contact edge of the lever member is slid in a shutter opening direction as contacting the corner of the shutter. Therefore, the frictional force inhibiting the opening operation of the shutter may be eliminated. Furthermore, an angle of inclination of the inclined surface is set so as not to generate a force required for disengagement of the shutter.

Other objects and features of the invention will be more fully understood from the following detailed description and appended claims when taken with the accompanying drawings.

DETAILED DESCRIPTION OF THE PREFERRED EMBODIMENT

Figure 1:
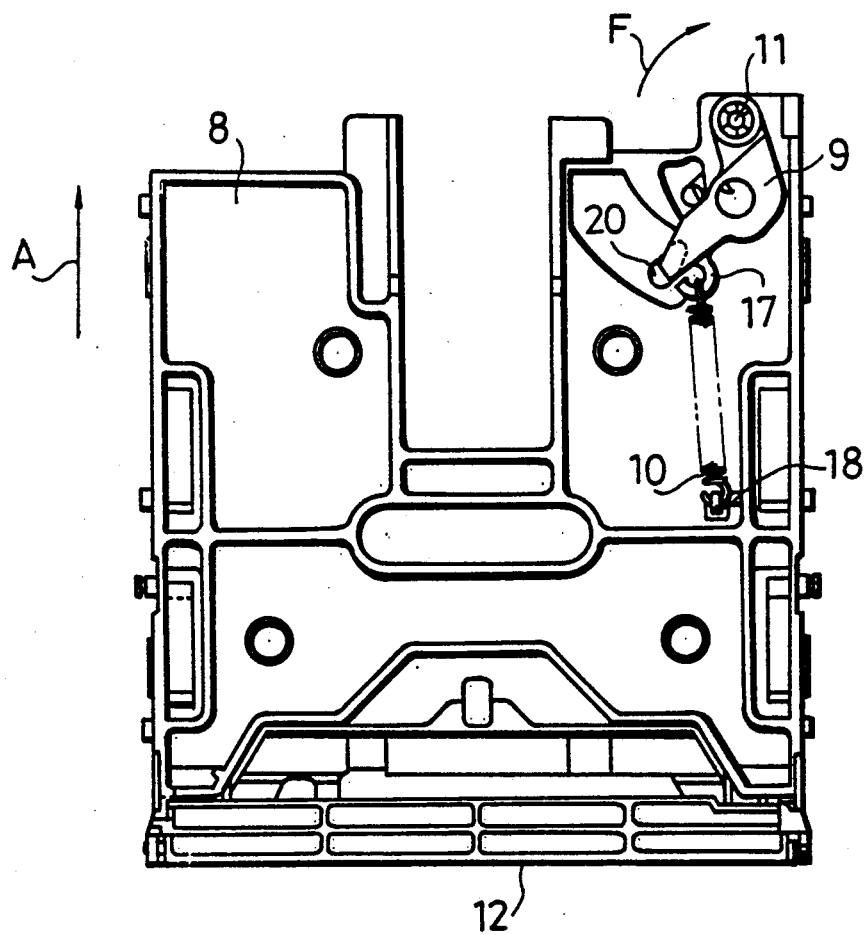
FIG. 1 is a top plan view of the cartridge holder according to the present invention.

There will now be described a preferred embodiment of the present invention with reference to the drawings, in which the same or corresponding parts are designated by the same reference numerals, and the explanation thereof will be omitted.

Figure 2:
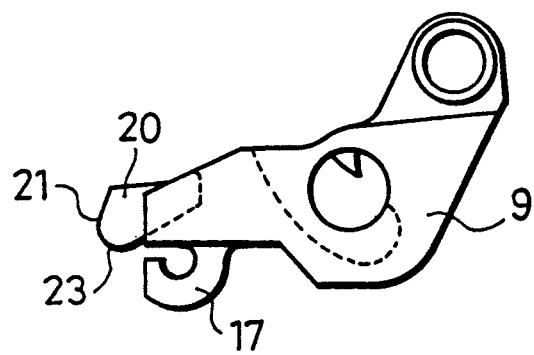
FIG. 2 is a top plan view of the ejecting plate shown in FIG. 1.
Figure 3:
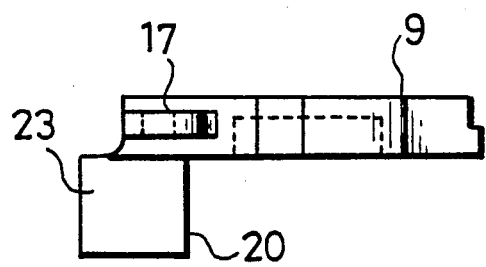
FIG. 3 is an elevational view of the ejecting plate shown in FIG. 2.
Figure 4:
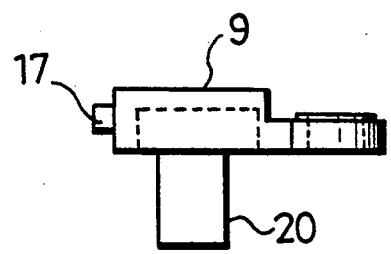
FIG. 4 is a right side view of the ejecting plate shown in FIG. 2.
Figure 5:
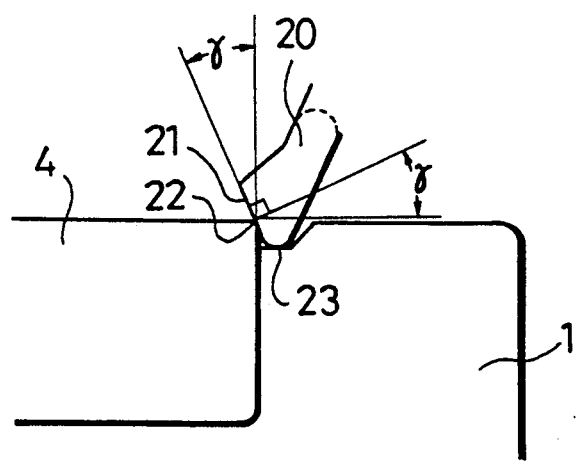
FIG. 5 is an enlarged plan view illustrating the abutment of the contact edge of the ejecting plate against the corner of the shutter according to the present invention.

Referring to FIG. 1, an ejecting plate 9 is provided at a deepest portion of the cartridge holder 8 with respect to the insert direction (the direction as depicted by the arrow A) of the disc cartridge in the same manner as the prior art previously mentioned. As shown in FIGS. 2, 3 and 4, the ejecting plate 9 is formed with a contact end portion 20 having an inclined surface 21. As shown in FIG. 5, the inclined surface 21 is designed to contact a corner 22 of the shutter 4. The contact end portion 20 is further formed with a curved end 23 on the side of the disc cartridge insert opening 12. The curved end 23 is designed to contact the contact portion E of the disc cartridge 1 at the same time or before the inclined surface 21 contacts the corner 22. When the inclined surface 21 contacts the corner 22, an angle of inclination γ of the inclined surface 21 from a plane perpendicular to the sliding direction of the shutter 4 is set to about 17°. The other construction is substantially the same as the prior art mentioned previously.

Figure 6:
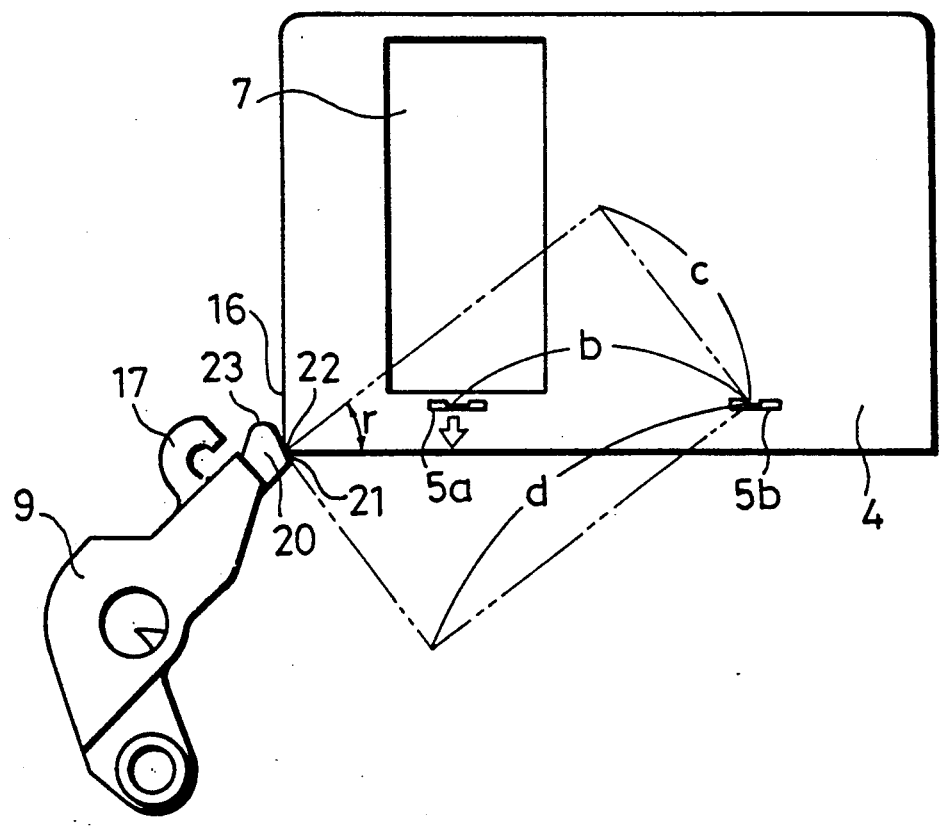
FIG. 6 is a plan view illustrating the relationship of forces to be generated upon abutment of the ejecting plate against the shutter.
Figure 7:
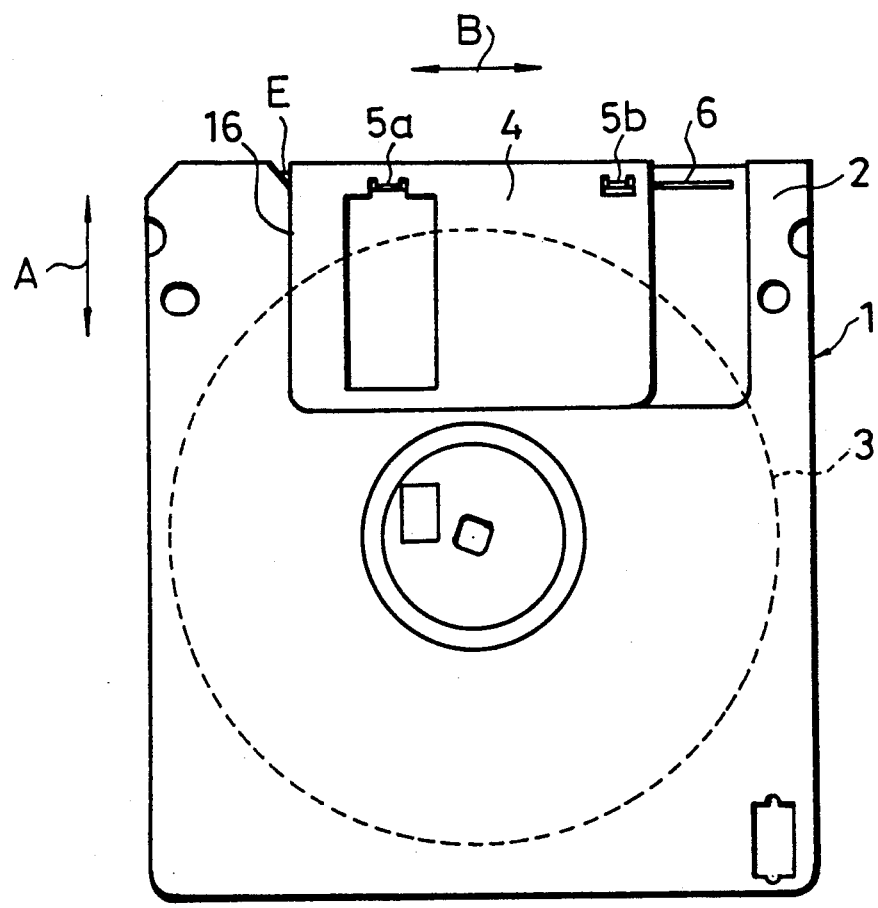
FIG. 7 is a bottom plan view of the disc cartridge.
Figure 8:
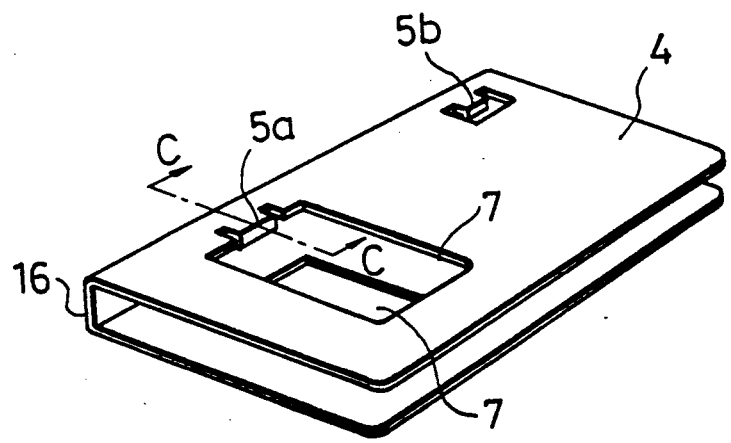
FIG. 8 is a perspective view of the shutter shown in FIG. 7.
Figure 9:
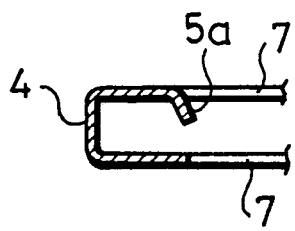
FIG. 9 is a cross section taken along the line C—C in FIG. 8.
Figure 10:
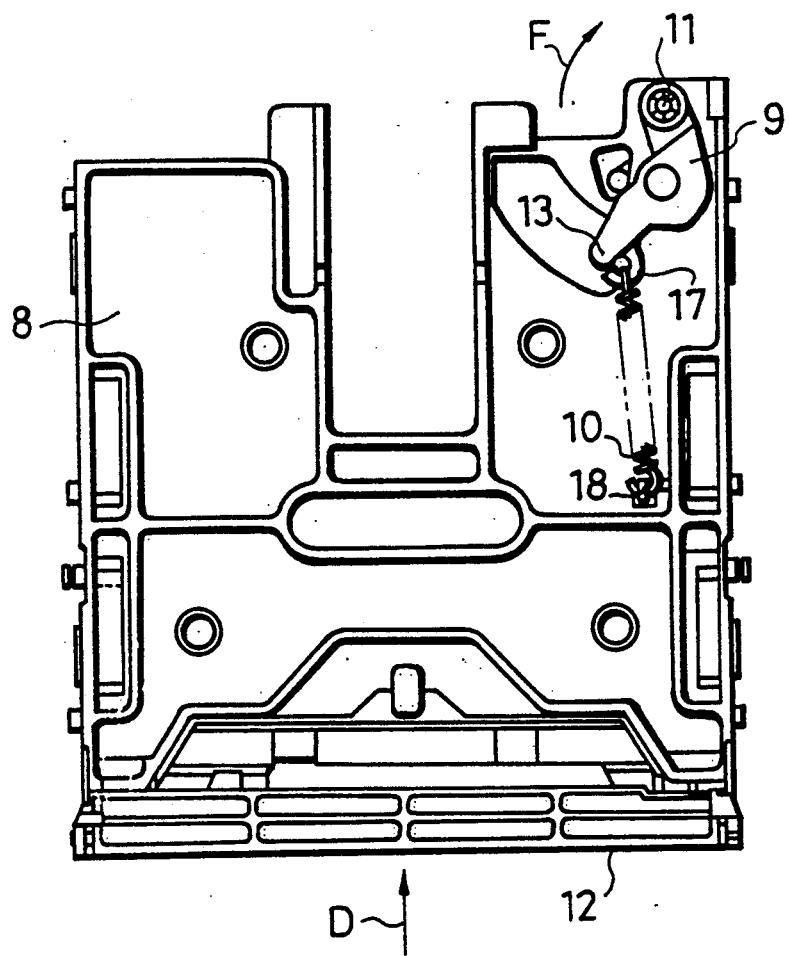
FIG. 10 is a top plan view of the cartridge holder in the prior art.
Figure 11:
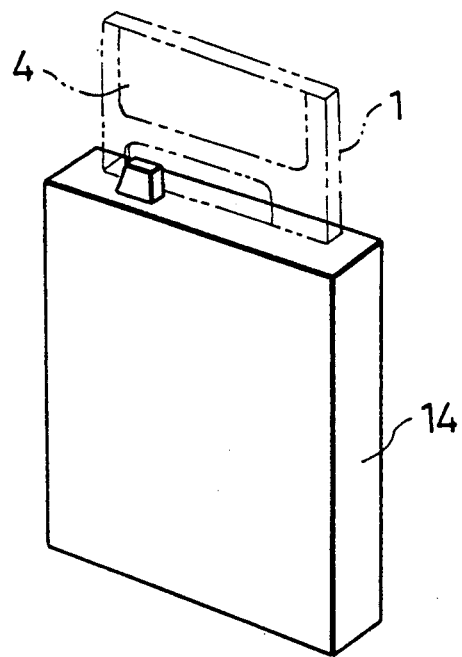
FIG. 11 is a perspective view of a prior art disc driving device of a vertical down-loading type.
Figure 12:
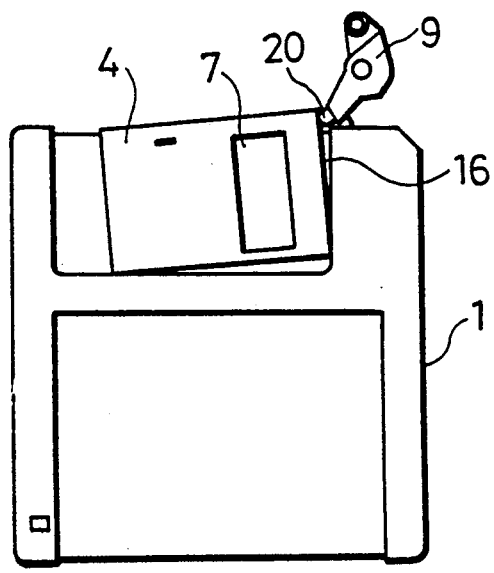
FIG. 12 is a top plan view of the disc cartridge, showing the disengagement of the shutter by the ejecting plate in the prior art.
Figure 13:
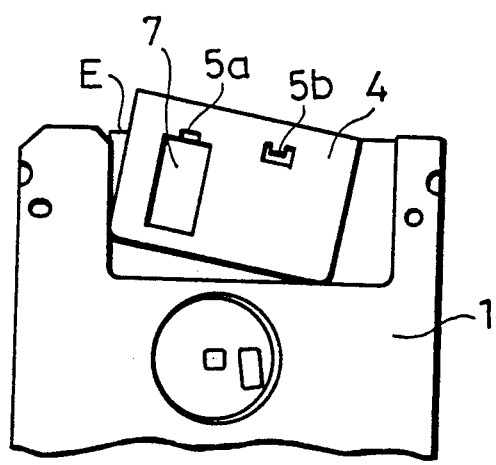
FIG. 13 is a bottom plan view similar to FIG. 12.
Figure 14:
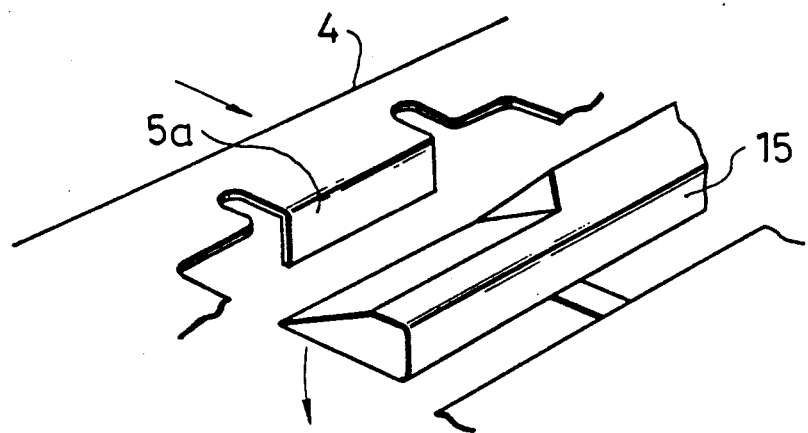
FIG. 14 is an enlarged perspective view of the supporting portion of the case of the disc cartridge for supporting the hinge of the shutter.
Figure 15:
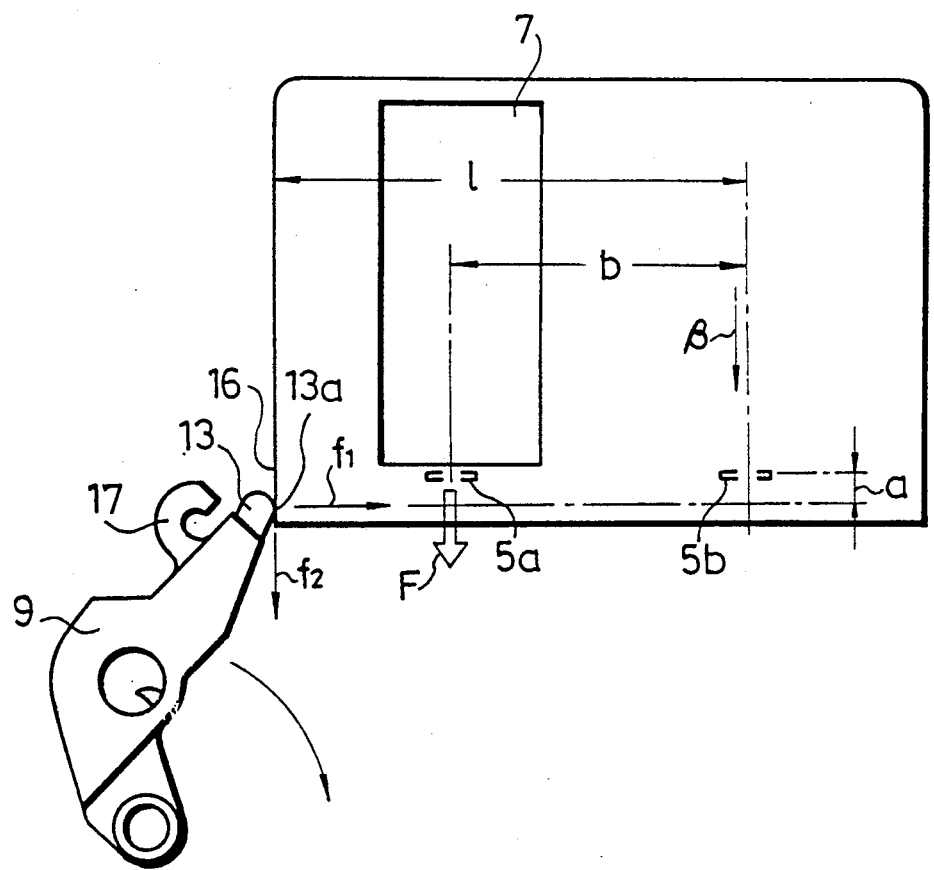
FIG. 15 is a view similar to FIG. 6, showing the construction in the prior art.

Referring to FIG. 6 which shows the condition where the inclined surface 21 of the contact end portion 20 of the ejecting plate 9 contacts the corner 22 of the shutter 4 to start opening the shutter 4, a force $F_1$ to be applied to the hinge $5a$ by the force $f_1$ due to the rotation moment to be generated in the ejecting plate 9 by the impact insertion of the disc cartridge 1 is expressed as follows:

$$F_1 = (f_1 \times c)/b$$

where reference character b represents a distance between both the hinges $5a$ and $5b$, and reference character c represents an arm length from the hinge $5b$.

Further, a force $F_2$ to be applied to the hinge $5a$ by the anti-frictional force $f_2$ to be generated by a reaction of the elastic force normally applied to the shutter 4 in its closing direction is expressed as follows:

$$F_2 = (f_2 \times d)/b$$

where reference character d represents an arm length from the hinge $5b$.

It should be appreciated that the direction of the force $f_1$ is perpendicular to the inclined surface 21 and the direction of the force $f_2$ is parallel to the inclined surface 21. Accordingly, the moment about the hinge $5b$ to be generated by the force $F_1$ is clockwise, and the moment about the hinge $5b$ to be generated by the force $F_2$ is counterclockwise. Therefore, the resultant force F to be applied to the hinge $5a$ is expressed as follows:

$$F = F_2 - F_1$$

The angle of inclination $\gamma$ of the inclined surface 21 is set to a value such that the value F does not exceed the aforementioned elastic limit, e.g., an observed value of 200 gf, so that the shutter 4 is not released from the case.

Further, a force to be applied to the shutter 4 in its sliding direction is expressed as follows:

$$P = f_1 \cos \gamma + f_2 \sin \gamma$$

Accordingly, the angle $\gamma$ is set in such that the force P is greater than a frictional force to be generated by the sliding direction of the shutter 4, so that the shutter 4 can always be slid and opened. However, if any part of the contact end portion 20 other than the inclined surface 21 is first brought into contact with the corner 22 of the shutter 4 at an appropriate angle, there is a possibility that the force $F_1$ to be applied to the shutter 4 in the direction as depicted by an arrow $\alpha$, i.e., in the direction counter to the shutter disengaging direction becomes large to render the frictional force excessive and hinder the opening operation of the shutter 4. According to the present invention, the angle $\gamma$ is set in such that the curved end 23 of the contact end portion 20 is first brought into contact with the contact portion E of the disc cartridge 1, so as to prevent the generation of an excessive frictional force. For this reason, the angle $\gamma$ is preferably set to 17°.

The 3.5 inch-diameter floppy disc cartridge employed in the above-mentioned preferred embodiment satisfies the standard defined by JIS X6223-1987 (90 mm flexible disc cartridge).

While the invention has been described with reference to a specific embodiment, the description is illustrative and is not to be construed as limiting the scope of the invention. Various modifications and changes may occur to those skilled in the art without departing from the spirit and scope of the invention as defined by the appended claims.

What is claimed is:

1. In a shutter opening device including a lever member rotatably supported at a deepest portion of a cartridge holder of a disc driving device with respect to an inserting direction of a disc cartridge and means for normally elastically biasing said lever member in an ejecting direction of said disc cartridge, said disc cartridge having a case formed with a head insertion opening and a shutter so mounted as to ride over one end of said case for normally closing said head insertion opening, said lever member being adapted to contact an end surface of said shutter upon insertion of said disc cartridge and open said shutter in a direction perpendicular to the inserting direction of said disc cartridge according to an inserting force of said disc cartridge; the improvement wherein said lever member has a contact end portion for contacting said shutter, said contact end portion being formed with an inclined surface having an angle of inclination from a plane perpendicular to a sliding direction of said shutter and further formed with a front end adapted to first contact said case of said disc cartridge, said inclined surface being adapted to contact a corner of said shutter, said angle of inclination of said inclined surface being set such that a force to be applied to said shutter by said lever member in a disengaging direction of said shutter upon contacting of said inclined surface with said corner is in a predetermined range not generating disengagement of said shutter.

2. The shutter opening device as defined in claim 1, wherein said angle of inclination of said inclined surface is set to 17°.

* * * * *